Patented Oct. 21, 1952

2,614,916

UNITED STATES PATENT OFFICE 2,614,916

AGRICULTURAL CHEMICAL COMPOSITIONS COMPRISING 1,2 - DIHYDROPYRIDAZINE-3,6-DIONE AND ITS SALTS

Otto L. Hoffmann, Bethany, and Dwight L. Schoene, Woodbridge, Conn., assignors to United States Rubber Company, New York, N. Y., a corporation of New Jersey No Drawing. Application July 20, 1949,
Serial No. 105,900

14 Claims. (Cl. 71—2.4)

This invention relates to agricultural chemical compositions comprising 1,2-dihydropyridazine-3,6-dione and its salts, more particularly as plant growth regulants and phytocides.

We have found that 1,2-dihydropyridazine-3,6-dione and its salts have the unique property of temporarily inhibiting the growth of certain plants without having any apparent ill effect on subsequent growth. In some cases, they show the formative effects of plant growth regulants. They are also capable of completely preventing growth and destroying certain plants.

The 1,2-dihydropyridazine-3,6-dione may be designated by the di-keto form, or the mono-keto mono-enol form, or the di-enol form of structural formula, respectively, as follows:

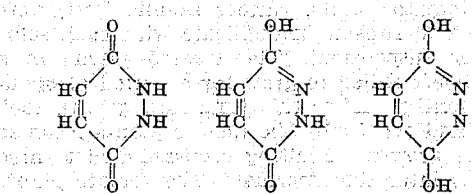

It may be obtained by reacting maleic anhydride and hydrazine according to the procedure of Curtius and Foersterling, J. Pr. Chem. (2) 51, 371-398 (1895).

An extremely useful application of the present invention is in the treatment of turf or lawns for the purpose of limiting the number of mowings required. The 1,2-dihydropyridazine-3,6-dione or its salts may also be used to delay flowering of fruit trees until danger of frost is past. It may be used where it is desired to have fruit or flowers at a later season than normal for any particular fruit or flower. It is useful in inhibiting the growth of shrubbery and nursery plants until frost danger is past. It may be used to prevent further growth or to destroy unwanted growing plants, that is, to control or destroy weeds.

The 1,2-dihydropyridazine-3,6-dione has a solubility in water at 25° C. of approximately 0.4%. 1,2-dihydropyridazine-3,6-dione readily forms salts with one molar equivalent of an alkali, such as alkali-metal hydroxides, ammonia and amines, such as alkylamines (e. g. methylamine, dimethylamine, ethylamine, isopropylamine, dodecylamine, cyclohexylamine), and alkanolamines (e. g. ethanolamine, diethanolamine, triethanolamine). Such alkali salts are more soluble in water than the parent compound. Such salts are readily formed by dissolving the 1,2-dihydropyridazine-3,6-dione in an aqueous solution containing one equivalent, or an excess, if desired, of the alkali. The amine salts may also be prepared by direct reaction of the reactants, or by reaction in organic solvents, such as alcohols. Polyvalent metals precipitate insoluble salts from such solutions of 1,2-dihydropyridazine-3,6-dione and its alkali-metal, ammonium and amine salts, forming such insoluble salts as the copper, zinc, calcium, barium, magnesium and iron salts. The 1,2-dihydropyridazine-3,6-dione and such salts of greater and lower solubility may all be used to temporarily inhibit and to prevent plant growth and to destroy growing plants according to the present invention.

The 1,2-dihydropyridazine-3,6-dione or its salts may be applied to plants (the term "plants" including plant parts, e. g. seeds) directly, or in an inert medium as a dust in admixture with a powdered solid carrier, such as the various mineral silicates, e. g. mica, talc, pyrophyllite and clays, or as an aqueous spray in solution or suspension in water. The 1,2-dihydropyridazine-3,6-dione or its salts may be applied in admixture with small amounts of a wetting agent which may be an anionic surface-active agent, a nonionic surface-active agent, or a cationic surface-active agent. The 1,2-dihydropyridazine-3,6-dione or its salts may also be admixed with powdered solid carriers, such as mineral silicates, together with a small amount of such a surface-active wetting agent so that a wettable powder may be obtained which may be applied directly to plants, or which may be shaken up with water to readily prepare a suspension of the chemical (and powdered carrier) in water for application to plants in that form. The concentration of the chemical in the inert medium depends upon the effect desired, the time of year, the age, species and variety of plant, the climatic conditions, etc.

The anionic surface-active agents that may be used in the present growth regulant and phytocidal compositions are those having a general formula selected from the group consisting of R—COOM, R—SO$_3$M, and R—OSO$_3$M, where M represents alkali-metal, ammonium or substituted ammonium (amine) radical, and R represents an organic radical containing at least one group having more than 8 carbon atoms. Examples of such anionic surface-active agents are:

(1) Soaps (e. g. sodium laurate, ammonium stearate, diethanol-ammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g. $C_{17}H_{33}$—O—$C_2H_4$—$SO_3$—Na).

(5) Sulfated ethers of long and short chain aliphatic groups (e. g. $C_{17}H_{33}$—O—$C_2H_4$—O—$SO_3Na$).

(6) Sulfonated alkyl esters of long chain fatty acids (e. g.

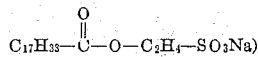

(7) Sulfonated glycol esters of long chain fatty acids (e. g.

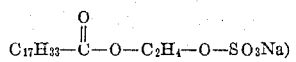

(8) Sulfonated alkyl substituted amids of long chain fatty acids (e. g.

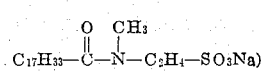

(9) Alkylated aryl sulfonated (e. g. isopropyl naphthalene sodium sulfonate, dodecyl benzene sodium sulfonate).

(10) Hydroaromatic sulfonates (e. g. tetrahydro-naphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate,

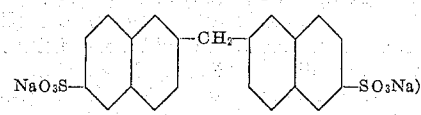

Non-ionic surface-active agents that may be used in the present growth regulant and phytocidal compositions are:

(1) Monoethers of polyglycols with long-chain fatty alcohols, such as reaction products of ethylene oxide or polyethylene glycol with a long-chain fatty alcohol (e. g. reaction product of ethylene oxide and oleyl alcohol, viz:

$C_{18}H_{35}$—$(OC_2H_4)_nOH$ where $n$ is 10 to 20).

(2) Monoesters of polyglycols with long chain fatty acids, such as reaction products of ethylene oxide or polyethylene glycol with a long chain fatty acid (e. g. reaction product of ethylene oxide or polyethylene glycol with oleic acid, viz:

where $n$ is 10 to 20).

(3) Monoethers of polyglycols with alkylated phenols, such as reaction products of ethylene oxide or polyethylene glycol with an alkyl phenol (e. g. reaction product of ethylene oxide and isopropyl phenol, viz:

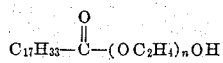

where $n$ is 10 to 20.

(4) Partial esters of polyhydric alcohols with long chain monocarboxylic (fatty and/or resin) acids (e. g. glycerol monostearate, sorbitan trioleate).

(5) Partial and complete esters of long chain monocarboxylic (fatty and/or resin) acids with polyglycol ethers of polyhydric alcohols (e. g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

Cationic surface-active agents that may be used in the present growth regulant and phytocidal compositions are:

(1) Quaternary ammonium salts in which one of the groups attached to the nitrogen has an aliphatic group having at least 8 carbon atoms (e. g. trimethyl cetyl ammonium iodide, lauryl pyridinium chloride, cetyl dimethyl benzyl ammonium chloride, N-stearyl betaine).

(2) Amines, amids, diamines and glyoxalidines having an aliphatic group containing at least 8 carbon atoms, and their acid esters (e. g. stearylamine hydrochloride, oleyl amide, diethylethylene oleyl diamine, mu-heptadecyl N-hydroxyethyl glyoxalidine).

The following examples are given to illustrate the invention, all parts referred to therein being by weight:

*Example I*

An aqueous solution of 1,2-dihydropyridazine-3,6-dione and aqueous suspensions of its cupric and zinc salts were made at concentrations of 2000 parts per million (p. p. m.) using one drop per 100 mg. of the chemical of a commercial surface-active wetting agent Emulphor EL (reaction product of ricinoleic acid and ethylene oxide) known to be inert to the plants under test. Six inch tomato plants, variety Bonnie Best, were sprayed to run-off in duplicate with each solution or suspension. The treated plants in a greenhouse failed to grow for a period of about two months. After this time slow growth took place and eventually the tomato plants resumed normal growth. Fruiting occurred about three months later than normal. The tomato plants did not develop necrotic spots nor show any injurious symptoms other than normal aging.

*Example II*

Areas of lawn 10 feet square were treated with 1,2-dihydropyridazine-3,6-dione at the rates of 8, 4, 2, and 1 pound per acre of the chemical. The required amount of chemical with Emulphor-EL at the rate of one drop per 100 mg. of the dione, was dissolved in 2000 ml. of water and sprayed on the foliage. The one pound rate inhibited growth for a few days. There was an inhibition of growth for about one week where the chemical was applied at the rate of two pounds per acre. The four pound per acre rate inhibited growth for three weeks. Regrowth in these plots was normal after the growth inhibiting periods. The eight pound per acre rate inhibited growth for about two months, at which time growth of all the treated and untreated plots was stopped because of cold winter weather. Plant varieties growing in the treated areas which were inhibited, included Kentucky blue grass, bentgrass, crabgrass, plantain, and chickweed.

In the following spring at the time of new growth, observations were made on the treated areas. The plots treated at the one, two and four pounds per acre rate showed approximately normal stand. The plot treated at the eight pounds per acre rate showed about 30 to 40% reduction in stand. Observations in mid summer still showed the thinning or reduction in stand of the area treated at the rate of eight pounds per acre, as compared with untreated areas and the areas treated with the 1,2-dihydropyridazine-3,6-dione at the rate of one, two and four pounds per acre.

Depending on the amount of growth inhibition and thinning effect desired, climatic conditions, soil fertility, and the like, varying amounts of 1,2-dihydropyridazine-3,6-dione or its salts may be used from $\frac{1}{10}$ to 10 or 15 pounds per acre. The concentrations used may be from 5 to 5000 parts of the chemical per million in aqueous suspension or solution.

Example III

Dormant winter lawn turf was transplanted in January from outdoors to flats in a greenhouse. After growth had started, one flat was treated with 50 cc. of an aqueous solution containing 0.18 gram of 1,2-dihydropyridazine-3,6-dione, and two drops of Emulphor-EL. This corresponds to an application rate of the dione of eight pounds per acre. A second flat was left untreated as a control.

Observations made four to six weeks after the application of the chemical showed that the treated grass was only about one-half as high as the untreated control, and that there was about 30 to 40% loss of stand or thinning (phytocidal effect) in the case of the treated area.

Example IV

Seed corn (Crow hybrid 607) was treated with ½, ¼, ⅛, $\frac{1}{16}$ and $\frac{1}{32}$ of 1% of the seed weight of 1,2-dihydropyridazine-3,6-dione by tumbling the seeds directly with the required amounts of the powdered chemical. Four replicates of 25 seeds of each of the chemical treatments and of an untreated control were planted in soil in flats in the greenhouse.

The time and amount of germination of the treated seeds and of the control were the same, showing normal germination.

After two weeks, the heights of the treated and untreated corn seedlings were measured given the following average heights (in centimeters): Untreated control—15.75 cm.; $\frac{1}{32}$% of chemical (on seed weight)—3.25 cm.; $\frac{1}{16}$% of chemical—2.08 cm.; ⅛% of chemical—1.65 cm.; ¼% of chemical—1.45 cm.; and ½% of chemical—1.08 cm.

The plants from the treated seeds did not further grow appreciably, whereas the control plants had normal growth.

About six weeks after planting, the plants from the treated seeds still not appreciably taller than recorded above, all died, whereas the control plants from the untreated seeds continued to grow normally.

From further work with lower dosages of the 1,2-dihydropyridazine-3,6-dione on corn seed, a temporary inhibition of growth of the seedlings was observed at $\frac{1}{64}$ and $\frac{1}{128}$ of 1% of the seed weight, but the plants later resumed growth.

Example V

This example illustrates the preparation of the amine salts of 1,2-dihydropyridazine-3,6-dione which are new chemicals.

One tenth mol each of monoethanol amine and 1,2-dihydropyridazine-3,6-dione were mixed directly at room temperature. An exothermic reaction resulted with rise in temperature to 90° F. giving a solid mass. The reaction mass was heated to 130° F. at which time it was all fluid. On cooling, there was a sharp solid solidification point at 106° to 108° C.

Thirty percent aqueous solutions of the diethanolamine and triethanolamine salts of 1,2-dihydropyridazine-3,6-dione were prepared by adding equimolar ratios of the reagents to water to give 30% solutions. Portions of the solutions were evaporated and dried at 100–110° C. The diethanolamine salt was a viscous oil. The triethanolamine salt formed a semi-crystalline mush.

That only the monoamine salts are formed is shown by the following:

0.15 mol of dodecylamine and 0.10 mol of 1,2-dihydropyridazine-3,6-dione were added to 50 cc. of alcohol. Crystals formed, which were filtered and recrystallized. The product was in the form of fine white crystals, having a melting point of 119.5–120.5° C. Analysis showed $C=64.7\%$ found; 64.7% theory for mono salt. $H=10.1\%$ found; 10.4% theory for mono salt. $N=14.0\%$ found, 14.1% theory for mono salt.

Example VI

Aqueous solutions of diethanolamine and triethanolamine salts of 1,2-dihydropyridazine-3,6-dione were made up to 2,000 p. p. m. based on the free 1,2-dihydropyridazine-3,6-dione and sprayed on tomato plants which were 7–10 cm. high. The treatment was carried out in duplicate and untreated controls were included. After two weeks in the greenhouse, the controls had increased in height some 15 cm., while the treated plants had grown not more than 2–3 cm., most of which occurred in the first two days after treatment. The treated plants remained healthy in appearance.

Example VII

An aqueous solution of the ammonium salt of 1,2-dihydropyridazine-3,6-dione was prepared by dissolving 5 parts of the 1,2-dihydropyridazine-3,6-dione in 10 parts (an excess of 28 percent aqueous ammonia. A portion of the solution was evaporated to dryness at 100–110° C., giving a solid which analyzed 8.5 percent ammonia (64% of theoretical due to some ammonia being lost during evaporation).

The aqueous solution of the crude ammonium salt was treated with Emulphor EL at the rate of 1 drop per 100 mg. of 1,2-dihydropyridazine-3,6-dione and diluted with water to give solutions containing, respectively, 2000, 1000 and 500 p. p. m. of the crude ammonium salt. These solutions were sprayed to run-off on tomato plants which were 7 cm. tall at the time of treatment. After eight days in a greenhouse the plant growth was measured with the following results:

| Concentration of 1,2-dihydropyridazine-3,6-dione, ammonium salt (p. p. m.) | Height, cm. | Increase, cm. | Percent Inhibition [1] |
|---|---|---|---|
| 0 (untreated control) | 18 | 11 | 0 |
| 500 | 12 | 5 | 54.6 |
| 1,000 | 10 | 3 | 72.8 |
| 2,000 | 9.5 | 2.5 | 77.4 |

[1] Percent inhibition $= \dfrac{11 - \text{increase in height of treated plant}}{11} \times 100$ In tests similar to the above ammonium salt tests, the dodecyl amine salt also inhibited growth of the tomato plants at 500 p. p. m. At 1000 p. p. m. it seriously injured the tomato plants. At 2000 p. p. m. it killed the tomato plants within a week.

Example VIII 1,2-dihydropyridazine-3,6-dione samples were weighed out; one equivalent of NaOH or amine, as indicated in the table below, was added in aqueous solution to portions of the dione giving, in effect, solutions of the mono salts of 1,2-dihydropyridazine-3,6-dione. The solutions were diluted to 2000 p. p. m. based on the 1,2-dihydropyridazine-3,6-dione content. Aliquots were further diluted to 1000 and 500 p. p. m. Two series of tests were run on the solutions of the 1,2-dihydropyridazine-3,6-dione and its salts, one series without addition of any wetting agent, and a second series with the addition of a wetting agent, viz., Emulphor EL. In the second series the wetting agent was added at the rate of 2 drops of Emulphor EL per 100 ml. of solution.

The solutions were sprayed on 10 cm. tall tomato plants on a revolving table using an atomizer. Spray time was 20 seconds. Run-off occurred after 8-10 seconds with the wetting agent solutions. No run-off was observed with samples containing no wetting agent. Thus, the samples without wetting agent were applied at about twice the deposit of the samples containing the wetting agent.

The plants were all allowed to grow in a greenhouse for one week. The results are given in percent inhibition which was calculated as follows:

$$\text{Percent inhibition} = \frac{13-N}{13} \times 100$$

where 13 is the increase in height in centimeters of the control or untreated plants and (N) is the increase in height of the treated plants in centimeters during the week following spraying of the treated plants. The results are given in the table below:

| Form of 1,2-dihydro-pyridazine-3,6-dione | Percent Inhibition— | | | | | |
|---|---|---|---|---|---|---|
| | Without Wetting Agent—Concentration of dione (p. p. m.) | | | With Emulphor EL—Concentration of dione (p. p. m.) | | |
| | 2,000 | 1,000 | 500 | 2,000 | 1,000 | 500 |
| Unsubstituted dione | 30.8 | 30.8 | 0 | 76.9 | 53.8 | 61.5 |
| Sodium Salt | 53.8 | 7.7 | 15.4 | 69.2 | 53.8 | 53.8 |
| Ammonium Salt | 61.5 | 46.2 | 38.5 | 84.6 | 69.2 | 84.6 |
| Isopropylamine Salt | 53.8 | 23.1 | 46.2 | 53.8 | 38.5 | 15.4 |
| Methylamine Salt | 0 | 23.1 | 30.8 | 61.5 | 61.5 | 46.2 |
| Ethylamine Salt | 53.8 | 15.4 | 30.8 | 69.2 | 61.5 | 30.8 |
| Diethanolamine Salt | 92.3 | 53.8 | 53.8 | 69.2 | 61.5 | 30.8 |
| Triethanolamine Salt | 84.6 | 61.5 | 76.9 | 76.9 | 69.2 | 76.9 |

In spite of the occasional variations due to experimental error, it is obvious that all of the samples except the ethanolamine salts were improved by the addition of wetting agent. This is surprising since, with the wetting agent, the actual quantity of the 1,2-dihydropyridazine-3,6-dione or its salts on the plants was reduced by run-off, to approximately one-half that of the treatments without the wetting agent. The ethanolamine salts, however, gave results both with and without the wetting agent comparable to the improved results of the other salts with the wetting agent. Thus, a wetting agent is not necessary with the ethanol amine salts but is definitely advisable with the alkali-metal, ammonium, and other amine salts, and the 1,2-dihydropyridazine-3,6-dione itself.

The inhibition data given are minima. Growth continues for one to three days after treatment and then stops. Had these data been taken after two to four weeks the percent inhibition would have been greater since the growth of the control would have been greater.

Example IX

Corn plants (Improved Carmel Cross) 22 days after planting, which were kept free of weeds in normal cultivation, were sprayed with an aqueous solution containing 1.2 pounds of the diethanolamine salt of 1,2-dihydropyridazine-3,6-dione per 100 gallons of water at the rate of 1.2 pounds of the salt per acre. Observations were made three weeks later, at which time the treated plants showed severe stunting and injury. Some of the plants appeared to have been substantially destroyed. Untreated corn plants in adjacent plots were growing normally.

A block of pea plants (Thomas Laxton), which had not been weeded, consisting of eight rows, twenty feet long, were treated 23 days after planting with the same rate of 1.2 pounds per acre of the diethanolamine salt of 1,2-dihydropyridazine-3,6-dione and at the same time as the corn plants above. Observations made three weeks later showed no effect of the chemical on the growth or appearance or yield of peas as compared with adjacent untreated pea plants. The most prominent weed, quick weed (*Galinsoga ciliata*), was substantially destroyed in the treated plot, as compared with luxuriant growth of the weed in the untreated plot. Another weed (pigweed) was markedly stunted in growth in the treated plot. A third weed (lamb's-quarters) was only slightly affected in the treated plot. The untreated plot had normal growth of the weeds.

The concentration of the chemical in aqueous solution or suspension will depend on the type of spray apparatus used and the amount of chemical to be applied per acre.

This application is a continuation-in-part of our application Serial No. 85,036, filed April 1, 1949, now abandoned.

Having thus described our invention, what we claim and desire to protect by Letters Patent is:

1. An agricultural chemical composition comprising material of the group consisting of 1,2-dihydropyridazine-3,6-dione and its salts, said composition containing a wetting agent.

2. An agricultural chemical composition comprising an aqueous suspension of material of the group consisting of 1,2-dihydropyridazine-3,6-dione and its salts, said aqueous suspension containing a wetting agent.

3. An agricultural chemical composition comprising material of the group consisting of 1,2-dihydropyridazine-3,6-dione and its salts, said composition containing a powdered solid carrier and a wetting agent.

4. An agricultural chemical composition comprising material of the group consisting of 1,2-dihydropyridazine-3,6-dione and its salts, said composition containing a mineral silicate and a wetting agent.

5. An agricultural chemical composition comprising material of the group consisting of 1,2-dihydropyridazine-3,6-dione and its salts, said composition containing a mineral silicate.

6. An agricultural chemical composition comprising material from the group consisting of 1,2-dihydropyridazine-3,6-dione and its salts, said composition containing a powdered solid carrier.

7. The method which comprises treating growing plants with material of the group consisting of 1,2-dihydropyridazine-3,6-dione and its salts in a concentration and amount sufficient to alter the growth characteristics of said plants.

8. The method of temporarily inhibiting the growth of lawns which comprises treating the lawns with material of the group consisting of 1,2-dihydropyridazine-3,6-dione and its salts in a concentration and amount sufficient to inhibit the growth of lawns.

9. The method of temporarily inhibiting the growth of lawns which comprises treating the lawns with $\frac{1}{16}$ to 15 pounds of material of the group consisting of 1,2-dihydropyridazine-3,6-dione and its salts per acre of lawn.

10. The method of temporarily inhibiting the flowering of plants which comprises treating the plants before flowering with material of the group consisting of 1,2-dihydropyridazine-3,6-dione and its salts in a concentration and amount sufficient to temporarily inhibit the flowering of plants.

11. The method of temporarily inhibiting the fruiting of plants which comprises treating the plants before fruiting with material of the group consisting of 1,2-dihydropyridazine-3,6-dione and its salts in a concentration and amount sufficient to temporarily inhibit the fruiting of plants.

12. An ethanolamine salt of 1,2-dihydropyridazine-3,6-dione.

13. The diethanolamine salt of 1,2-dihydropyridazine-3,6-dione.

14. The triethanolamine salt of 1,2-dihydropyridazine-3,6-dione.

OTTO L. HOFFMANN.
DWIGHT L. SCHOENE.

REFERENCES CITED

The following references are of record in the file of this patent:

UNITED STATES PATENTS

| Number | Name | Date |
|---|---|---|
| 2,396,513 | Jones | Mar. 12, 1946 |

OTHER REFERENCES

Hoffmann et al.: Science 109, 588–590 (1949).
Curtius et al.: J. Pr. Chem., (2) 51, 391–392 (1895).
Beilstein, vierte Auflage, vol. 24, page 312.